US008711815B2

(12) United States Patent
Kawamura et al.

(10) Patent No.: US 8,711,815 B2
(45) Date of Patent: Apr. 29, 2014

(54) MOBILE TERMINAL APPARATUS, RADIO BASE STATION APPARATUS AND RADIO COMMUNICATION METHOD

(75) Inventors: Teruo Kawamura, Tokyo (JP); Mamoru Sawahashi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 97 days.

(21) Appl. No.: 13/388,131

(22) PCT Filed: Aug. 2, 2010

(86) PCT No.: PCT/JP2010/063012
§ 371 (c)(1),
(2), (4) Date: Mar. 9, 2012

(87) PCT Pub. No.: WO2011/016414
PCT Pub. Date: Feb. 10, 2011

(65) Prior Publication Data
US 2012/0155412 A1 Jun. 21, 2012

(30) Foreign Application Priority Data

Aug. 5, 2009 (JP) ................................. 2009-182808

(51) Int. Cl.
*H04B 7/216* (2006.01)
(52) U.S. Cl.
USPC ......................................................... 370/335
(58) Field of Classification Search
USPC ............ 370/20, 328–339, 441; 375/140–141, 375/146, 147
See application file for complete search history.

(56) References Cited

U.S. PATENT DOCUMENTS

| 5,878,037 | A | * | 3/1999 | Sherman | 370/335 |
| 6,980,531 | B1 | * | 12/2005 | Rudrapatna | 370/323 |
| 7,796,575 | B2 | * | 9/2010 | Lim et al. | 370/342 |
| 7,969,943 | B2 | * | 6/2011 | Miki et al. | 370/329 |
| 2009/0303937 | A1 | | 12/2009 | Sawahashi et al. | |
| 2010/0309857 | A1 | * | 12/2010 | Kawamura et al. | 370/329 |

FOREIGN PATENT DOCUMENTS

| JP | 7-303090 A | 11/1995 |
| JP | 2002-111631 A | 4/2002 |
| JP | 2009-111780 A | 5/2009 |
| WO | 2006/134946 A1 | 12/2006 |
| WO | 2008/114663 A1 | 9/2008 |

OTHER PUBLICATIONS

Notification of Reasons for Rejection w/translation issued for Japanese Patent Application No. 2009-182808, dated Oct. 2, 2012, (6 pages).

(Continued)

*Primary Examiner* — Frank Duong
(74) *Attorney, Agent, or Firm* — Osha Liang LLP

(57) ABSTRACT

To provide a mobile terminal apparatus, radio base station apparatus and radio communication method capable of supporting user multiplexing methods for enabling more users to be efficiently multiplexed on an uplink shared channel, the mobile terminal apparatus performs spreading processing for multiplying a data signal by a code varying for each user, and transmits the spreading-processed data signal to the radio base station apparatus on the uplink shared channel, and the radio base station apparatus receives the data signal, and user-separates a reception signal in which is mixed a plurality of users multiplied by spreading codes varying for each user into desired user signals to be data signals for each user.

5 Claims, 11 Drawing Sheets

(56) References Cited

OTHER PUBLICATIONS

Office Action for Japanese Patent Application No. 2009-182808 dated Jun. 5, 2012, with English translation thereof (6 pages).
3GPP TS 36.211 v8.3.0, May 2008, "3rd Generation Partnership Project; Technical Specification Group Radio Access Network; Evolved Universal Terrestrial Radio Access (E-UTRA); Physical Channels and Modulation (Release 8)," 77 pages.
Abstract and Bibliographic data for WO 2008/114663 A1, dated Sep. 25, 2008, downloaded from the Espacenet Worldwide Database, 1 page.
K. Higuchi, "Orthogonal CDMA-Based Multiplexing Method for L1/L2 Control Channels in Evolved UTRA Uplink B-5-67," Proceedings of the 2007 IEICE General Conference, Tsushin 1, Mar. 7, 2007, 3 pages.
International Search Report issued in PCT/JP2010/063012, mailed on Oct. 19, 2010, 2 pages.

\* cited by examiner

MOBILE TERMINAL APPARATUS, RADIO BASE STATION APPARATUS AND RADIO COMMUNICATION METHOD

TECHNICAL FIELD

The present invention relates to a mobile terminal apparatus, radio base station apparatus and radio communication method in the next-generation mobile communication system.

BACKGROUND ART

The radio interface of the W-CDMA (Wideband Code Division Multiple Access) scheme, which is adopted as the radio access scheme of the third-generation mobile communication system, is extended, and for the purpose of further increasing the speed, HSDPA (High-Speed Downlink Packet Access) and HSUPA (High-Speed Uplink Packet Access) have been studied and specified. As a successor to the systems, for the purpose of further increasing frequency usage efficiency and peak data rates, reducing connection delay and the like, the Long-Term Evolution (LTE) system of the current system has been studied and specified in 3GPP (3rd Generation partnership Project) that is a standardization group of W-CDMA (Non-patent Document 1). In LTE, as distinct from W-CDMA, as radio access schemes, the scheme based on OFDMA (Orthogonal Frequency Division Multiple Access) is adopted in downlink, and the scheme based on SC-FDMA (Single Carrier Frequency Division Multiple Access) is adopted in uplink.

OFDMA is a multicarrier transmission scheme for dividing a transmission frequency band into a plurality of narrow frequency bands (subcarriers) and mapping data to each subcarrier to perform transmission. The multicarrier scheme is high in tolerance to frequency selective fading (multipath interference) such that the effect becomes remarkable by broadening the band, and therefore, holds promise of providing signal transmission with higher quality than the single-carrier transmission scheme.

SC-FDMA is of single-carrier transmission, is thereby low in the temporal variation (Peak to Average Power Ratio) of transmission power, and is preferable from the viewpoints of expansion of coverage and low power consumption in the terminal. Further, as distinct from W-CDMA, SC-FDMA is a single-carrier transmission scheme for transmitting (frequency division multiplexing) data from different users using respective different frequency bands in some transmission interval.

In LTE, to improve efficiency in the use of radio resources more than the present time, radio resources using both the frequency domain and time domain are allocated to each user apparatus. The radio resources are allocated us ing a block of a size comprised of some band (for example, 180 kHz) and some transmission interval (for example, 1 msec) as a unit. This unit is called the resource block (RB). In relation to the frequency and time domains, by instantaneously allocating one or more resource blocks to users in the channel state, it is possible to enhance entire system throughput. Allocation of resource blocks to users is determined in a base station, and the processing is called scheduling.

As distinct from the 3G mobile communication system optimized for circuit-switching networks, LTE is optimized for packet-switching networks. Meanwhile, in LTE, at least voice data (VoIP) needs to achieve good radio quality equal to voice transmission using circuit-switching networks. Therefore, in LTE, circuit-switching like radio resource allocation is performed on voice data. More specifically, a certain pattern of radio resources is allocated to voice data periodically (at fixed time intervals), and radio resources are thereby allocated more preferentially than data communications.

As shown in FIG. 1, signals transmitted in uplink are mapped to appropriate radio resources, and transmitted from a mobile terminal apparatus to a radio base station apparatus. In this case, user data (user data from user equipment (UE) #1 and UE #2) is allocated to the PUSCH (Physical Uplink Shared Channel), and control information is time-multiplexed with a data signal on the PUSCH when the control information and user data is concurrently transmitted, while being allocated to the PUCCH (Physical Uplink Control Channel) when only the control information is transmitted. As shown in FIG. 1, the PUCCH is multiplexed into radio resources each having a narrow frequency bandwidth at opposite ends of the system band, inter-slot frequency hopping (Inter-slot FH) is applied to two slots having different frequency bands in a subframe, and it is configured to obtain high frequency diversity gain.

The transmission bandwidth of the PUSCH is determined by instructions of the radio base station apparatus (frequency scheduling), and typically, more information symbols are transmitted on the PUSCH than on the PUCCH with the narrow band. As shown in FIG. 2, a subframe of the PUSCH is comprised of two slots, and one slot is comprised of seven SC-FDMA symbols. A reference signal (RS) used in channel estimation for coherent detection demodulation of data is multiplexed into the fourth symbol in a slot, and data and control information is multiplexed into the other symbols (first symbol (#1) to third symbol (#3), fifth symbol (#4) and seventh symbol (#6)). In addition, in one subframe, the slot is repeated twice. As in the PUCCH, it is also possible to apply inter-slot frequency hopping.

CITATION LIST

Non-Patent Literature

[Non-Patent Literature 1]
3GPP, TS 36.211 (V8.3.0), "Evolved Universal Terrestrial Radio Access (E-UTRA); LTE Physical Layer-General Description (Release 8)," March 2009.

SUMMARY OF THE INVENTION

Technical Problem

In the case where data signals from a plurality of users are transmitted on the PUSCH, as shown in FIG. 1, resource blocks subjected to frequency division and time division are allocated to each user by frequency and time scheduling (frequency division multiplexing/time division multiplexing). In the LTE system and further the next-generation mobile communication system (LTE-Advanced system), to further enhance frequency usage efficiency, it is desirable to hold more users in the mobile communication system. Particularly, with respect to voice communications of fixed rate, it is desirable to efficiently hold more users in the mobile communication system. Therefore, desired are user multiplexing methods which enable more users to be efficiently multiplexed on the uplink shared channel (PUSCH).

The invention was made in view of the respect, and it is an object of the invention to provide a mobile terminal apparatus, radio base station apparatus and radio communication method capable of supporting user multiplexing methods for enabling more users to be efficiently multiplexed on an uplink shared channel.

Solution to Problem

A mobile terminal apparatus of the invention is characterized by having spreading processing section configured to perform processing for multiplying a data signal by a code varying for each user, and transmission section configured to transmit the spreading-processed data signal to a radio base station apparatus on an uplink shared channel.

A radio base station apparatus of the invention is characterized by having reception section configured to receive a data signal subjected to spreading processing with a code varying for each user via an uplink shared channel, and user separating section configured to separate desired user signals from a reception signal in which is mixed a plurality of users multiplied by spreading codes varying for each user to be data signals for each user.

Advantageous Effect of the Invention

According to the invention, a mobile terminal apparatus performs spreading processing for multiplying a data signal by a code varying for each user, and transmits the spreading-processed data signal to a radio base station apparatus on the uplink shared channel, the radio base station apparatus receives the data signal, and user-separates desired user signals from a reception signal in which is mixed a plurality of users multiplied by spreading codes varying for each user to be data signals for each user, and it is thereby possible to multiplex more users than the current method for allocating users to only respective radio resources of the orthogonal frequency domain, time domain and code domain.

DESCRIPTION OF EMBODIMENTS

Embodiments of the invention will specifically be described below with reference to accompanying drawings.

Figure 1:
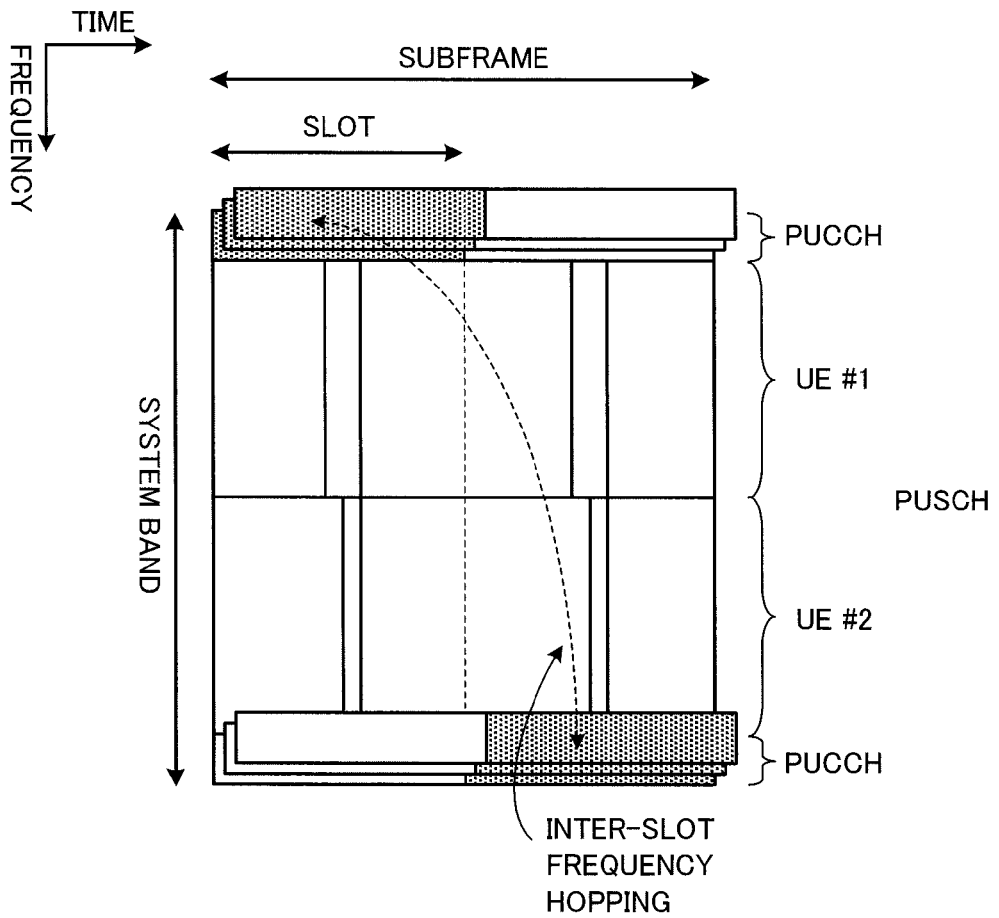
FIG. 1 is a diagram to explain a channel configuration to map signals in uplink.
Figure 2:
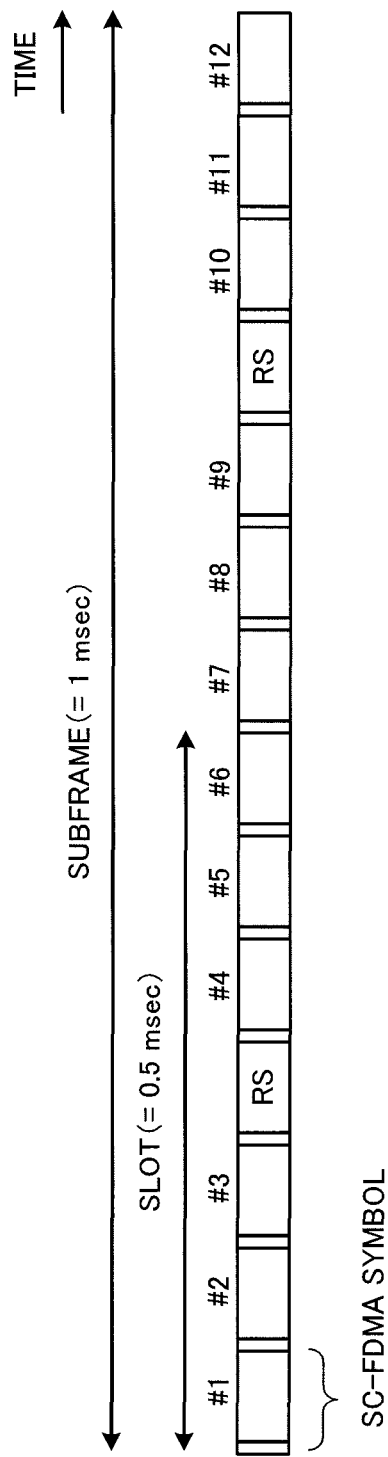
FIG. 2 is a diagram illustrating a subframe configuration of the PUSCH in uplink.

In transmission of the PUSCH in the LTE system, as shown in FIG. 1, a plurality of users is multiplexed using frequency division multiplexing and/or time division multiplexing. The inventor of the invention achieved efficiently multiplexing more users on the PUSCH by using code division multiplexing in addition to frequency division multiplexing and time division multiplexing in transmission of the PUSCH.

In the invention, to make the number of users to multiplex on the PUSCH higher, it is a feature using code division multiplexing as a multiplexing method. In other words, the invention is characterized by multiplying a data signal (particularly, intended for voice of fixed rate, etc.) from a different mobile terminal apparatus transmitted on the PUSCH by a user specific code. Herein, the code includes orthogonal codes and non-orthogonal codes. As a multiplexing methods of signals among users using orthogonal codes, there are a block spreading method for assigning orthogonal code sequences varying for each user, and thereby achieving orthogonalization on an SC-FDMA symbol block basis, and a cyclic shift method for providing the same code sequence with cyclic shift amounts varying for each user, and thereby achieving orthogonalization between users. Meanwhile, as a non-orthogonal multiplexing method, there is a method for spreading a data signal by a scramble code varying for each user, etc.

Figure 3:
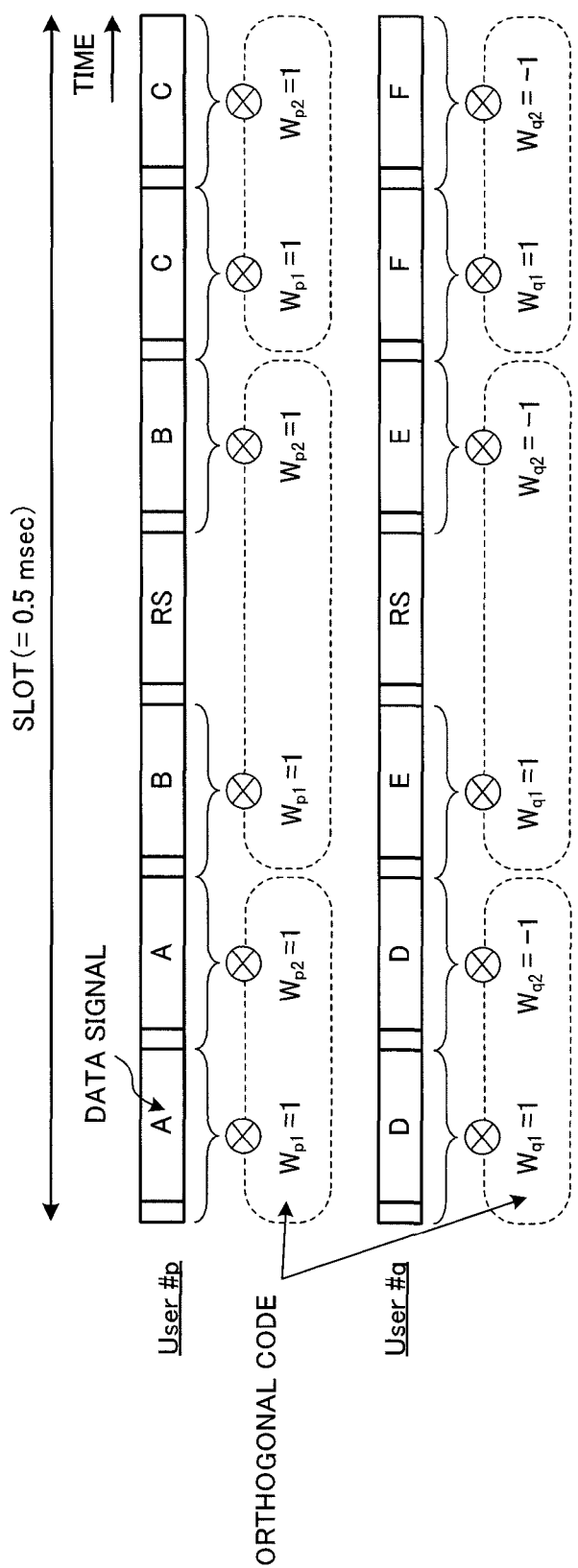
FIG. 3 is a diagram to explain an orthogonal multiplexing method by a block spreading method.

The block spreading method that is a method of multiplexing users using orthogonal codes is an orthogonal multiplexing method for applying orthogonal codes over a plurality of blocks in the time domain using an SC-FDMA symbol as a single unit block. For example, as shown in FIG. 3, in the case of orthogonally multiplexing signals between two users by the block spreading method, for a user #p, a data signal A in one SC-FDMA is replicated to map to two SC-FDMA symbols (first and second symbols), a data signal B in one SC-FDMA is replicated to map to two SC-FDMA symbols (third and fifth symbols), and a data signal C in one SC-FDMA is replicated to map to two SC-FDMA symbols (sixth and seventh symbols). Then, two SC-FDMA symbols of each of the data signal A to data signal C are multiplied by a first orthogonal code $(W_{p1}, W_{p2})=(1,1)$. For a user #q, a data signal D in one SC-FDMA is replicated to map to two SC-FDMA symbols (first and second symbols), a data signal E in one SC-FDMA is replicated to map to two SC-FDMA symbols (third and fifth symbols), and a data signal F in one SC-FDMA is replicated to map to two SC-FDMA symbols (sixth and seventh symbols). Then, two SC-FDMA symbols of each of the data signal D to data signal F are multiplied by a second orthogonal code $(W_{q1}, W_{q2})=(1,-1)$.

Since the first orthogonal code $(W_{p1}, W_{p2})=(1,1)$ and second orthogonal code $(W_{q1}, W_{q2})=(1,-1)$ varying for each user are mutually orthogonal, it is possible to achieve orthogonalization between users by multiplication by the orthogonal codes, and the radio base station apparatus is capable of separating uplink shared channel signals for each user from a reception signal in which signals from two users are mixed. Accordingly, in the Description, the processing for multiplying data signals by mutually orthogonal codes (orthogonal codes varying for each user) on an SC-FDMA symbol block basis over a plurality of blocks in the time domain is referred to as orthogonal spreading processing by the block spreading method.

Figure 4:
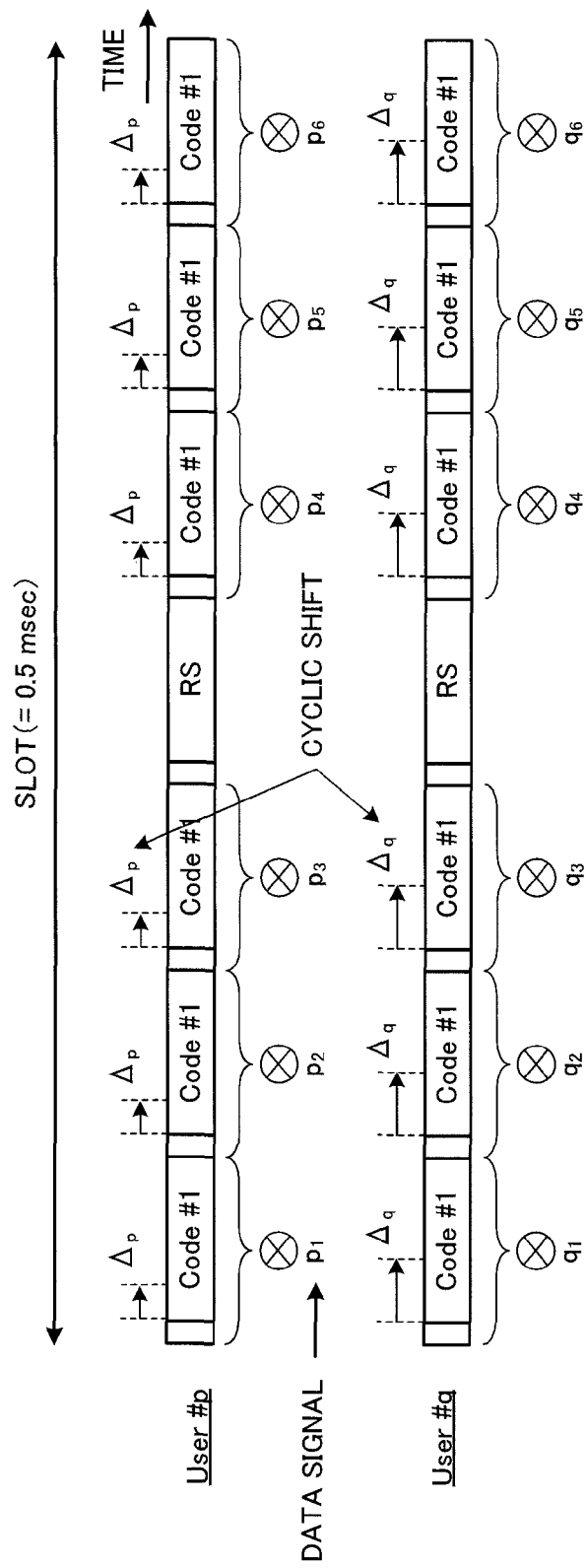
FIG. 4 is a diagram to explain an orthogonal multiplexing method by cyclic shift.

The cyclic shift method that is a method for multiplexing signals of users using orthogonal codes is an orthogonal multiplexing method using the cyclic shift of CAZA codes or sequences similar thereto. In other words, the cyclic shift method is an orthogonal multiplexing method using the property that a sequence obtained by cyclically shifting a CAZAC code sequence with code length L by a first shift amount and another sequence obtained by cyclically shifting the CAZAC code sequence by a second shift amount (different from the first shift amount) are orthogonal to each other. In this method, for example, as shown in FIG. 4, for a user #p, a CAZAC code sequence (Code #1) with code length L is cyclically shifted by Δp, and for a user #q, the same CAZAC code sequence (Code #1) with code length L is cyclically shifted by Δq. Further, data signals are multiplexed by performing modulation (block modulation) on the entire singe SC-FDMA symbol with a single data signal (symbol), and therefore, the orthogonality is maintained between signals of users by the cyclic shift of the same sequence. In addition, the interval of the cyclic shift of the CAZAC code sequence to assign to users is preferably set to be longer than the maximum delay amount of multipath.

Thus, by assigning cyclic shift amounts varying for each user, it is possible to achieve orthogonalization between users, and the radio base station apparatus is capable of separating uplink shared channel signals for each user from a reception signal in which signals from two users are mixed. Accordingly, in the Description, the processing for providing the same CAZAC code sequence with cyclic shift amounts different between users to perform block modulation is referred to as orthogonal spreading processing by the cyclic shift method.

Figure 5:
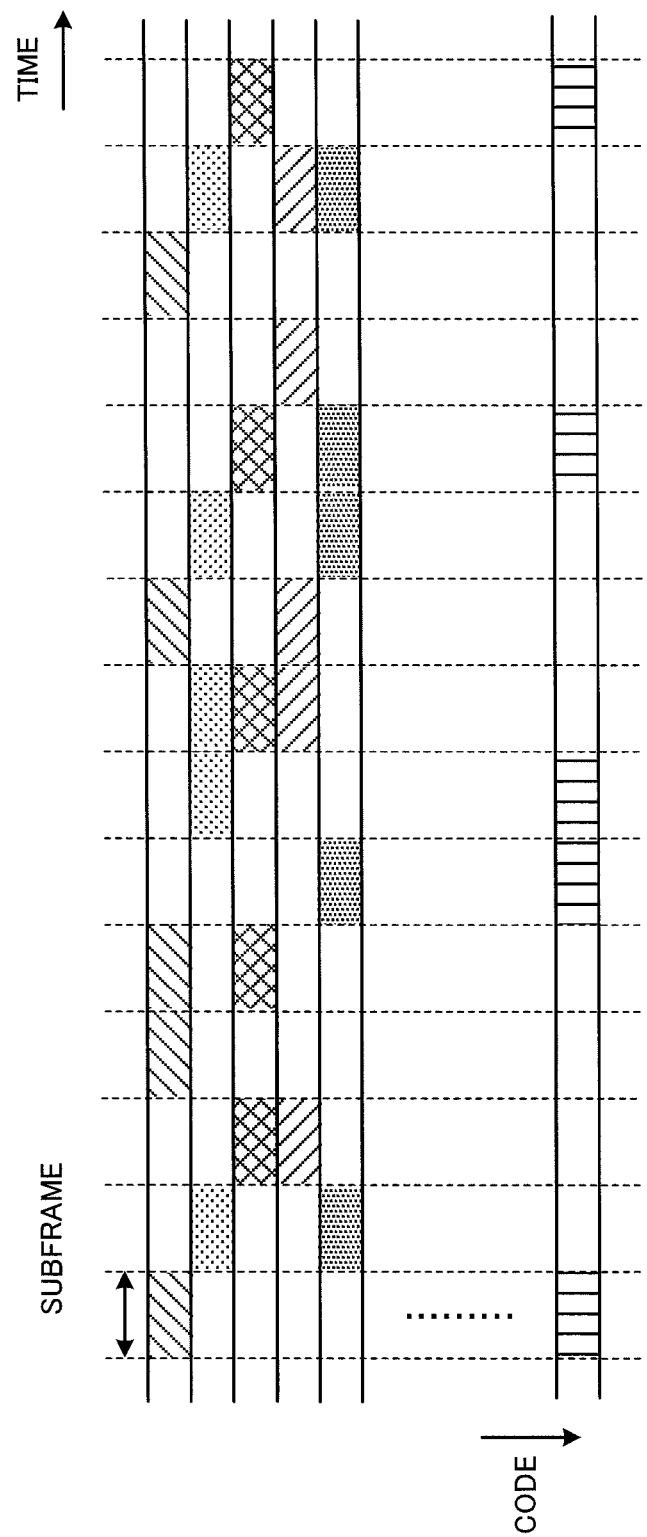
FIG. 5 is a diagram to explain user multiplexing by a non-orthogonal multiplexing method.

Meanwhile, as in uplink of W-CDMA, in the case of multiplying a data signal by a scramble code varying for each user, signals of users are of non-orthogonal code division multiplexing. When voice communications of fixed rate are considered, the terminal transmits voice data intermittently (the terminal transmits voice packets in speaking, while receiving voice packets in hearing from the communicating party.) In this case, as shown in FIG. 5, even when the number of connected users is high, all the users do not concurrently transmit voice packets in some subframe, and signals among users are not orthogonal but do not always result in significant interference (statistical multiplexing effect). Therefore, as a result, it is possible to accommodate more users at the same time (increase the capacity) than the case of allocating radio resources of orthogonal time, frequency or code to each user, by using the aforementioned statistical multiplexing effect.

Accordingly, in the Description, spreading processing for multiplying data signals by non-orthogonal codes varying for each user is referred to as non-orthogonal spreading processing. In addition, in the case of using the non-orthogonal multiplexing method, it is possible to enhance reception performance by using signal processing of an interference canceller for canceling interfering signals of other users, linear filter or the like in a reception section in the radio base station apparatus.

Figure 6:
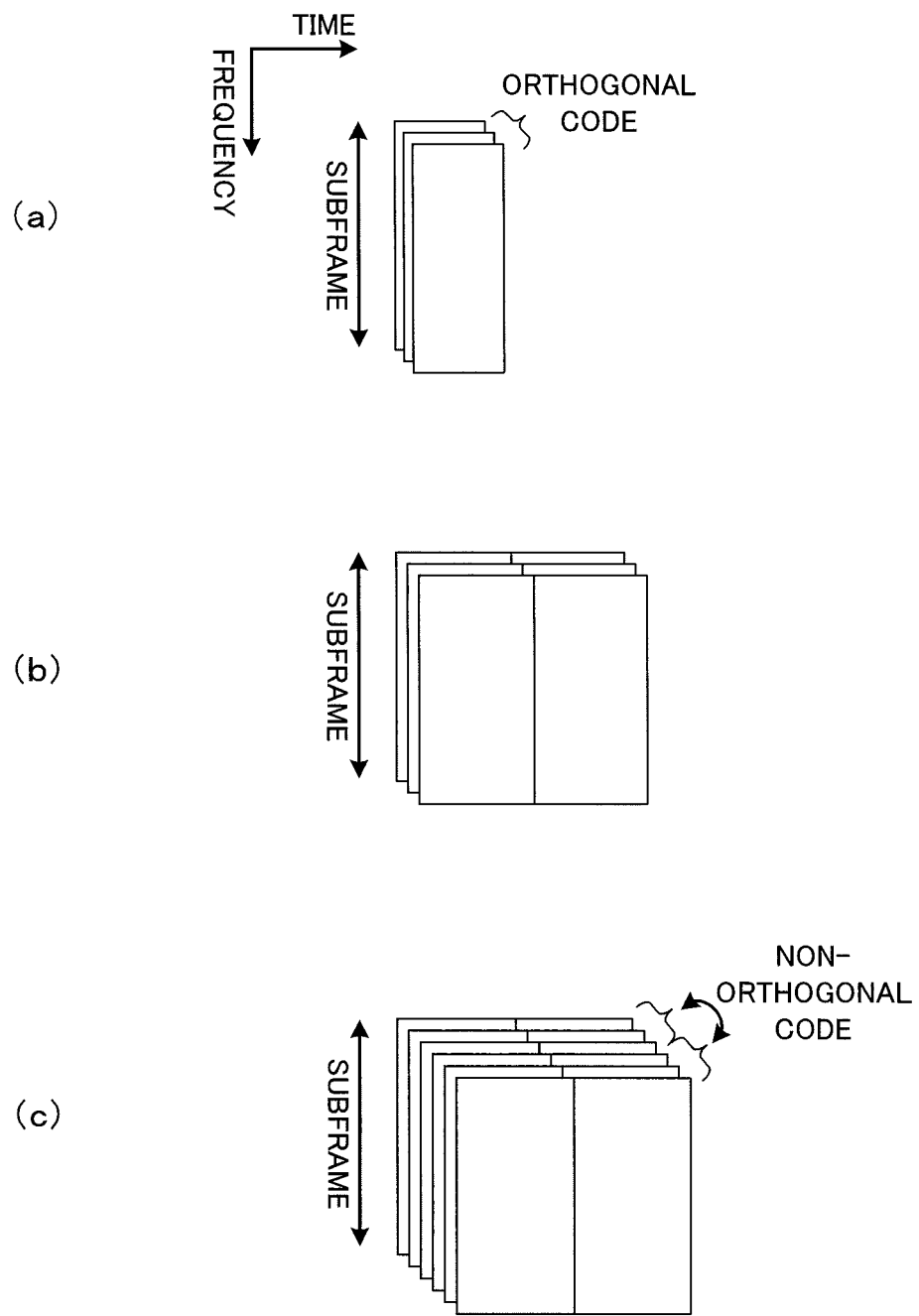
FIGS. 6(a) to 6(c) are diagrams to explain user multiplexing in a radio communication method according to an Embodiment of the invention.

In the invention, user multiplexing by the orthogonal multiplexing method and user multiplexing by the non-orthogonal multiplexing method may be switched as appropriate corresponding to the number of multiplexed users, or may be combined corresponding to the number of multiplexed users. For example, when the number of multiplexed users is relatively low, as shown in FIG. 6(*a*), signals among users are orthogonally multiplexed with orthogonal codes (orthogonal code division multiplexing). When the number of multiplexed users further increases, as shown in FIG. 6(*b*), signals among users are orthogonally multiplexed by concurrently using orthogonal code division multiplexing and frequency division multiplexing using different frequency bands. When the number of multiplexed users further increases, as shown in FIG. 6(*c*), signals among users are code-multiplexed with non-orthogonal codes in the same frequency band in addition to orthogonal multiplexing concurrently using orthogonal code division multiplexing and frequency division multiplexing. By thus stepwise combinations of orthogonal and non-orthogonal multiplexing, it is possible to efficiently increase the number of multiplexed users, and to increase the capacity in the mobile communication system.

Described herein is the case of combining multiplexing of signals among users by orthogonal codes and multiplexing of users by non-orthogonal codes. Described first is the case of combining the block spreading method and the non-orthogonal multiplexing method. The number of orthogonal codes used in the block spreading method is limited. Therefore, when the number of usable orthogonal codes of block spreading exceeds the number of users to multiplex, data signals are multiplied by scramble codes varying for each user. In this way, even when the same block spreading code is used among users, since scramble codes multiplied by data are different from one another, it is possible to separate into signals among users by the reception processing based on correlation detection of scramble codes in the radio base station apparatus.

Described next is the case of combining the cyclic shift method and the non-orthogonal multiplexing method. In this case, as in the above-mentioned case, the number of orthogonal codes used in the cyclic shift method is limited. Therefore, when the number of usable orthogonal codes of cyclic shift exceeds the number of users to multiplex, CAZAC code sequences (Code #2, Code #3 . . . ) varying for each user are used. In this way, users provided with different cyclic shift amounts on the same CAZAC code are mutually orthogonally multiplexed, and users using different CAZAC code sequences are of non-orthogonal code division multiplexing. For example, with the description given using FIG. 4, a user of cyclically shifting the CAZAC code sequence (Code #1) by Δp and another user of cyclically shifting the CAZAC code sequence (Code #1) with code length L by Δq are mutually orthogonally multiplexed, and users using the CAZAC code sequence (Code #1) and users using a different CAZAC code sequence (Code #2) are non-orthogonally multiplexed irrespective of the cyclic shift amount. Accordingly, even when the same cyclic shift is provided between users, since the CAZAC code sequences are different from each other, it is possible to separate into signals among users by the reception processing based on correlation detection of CAZAC code sequences in the radio base station apparatus.

In the invention, on the PUSCH, a resource block (RB) to multiplex signals among users by code division multiplexing is separated from an RB subjected to normal frequency multiplexing/time multiplexing (specified in the LTE system) and used. In other words, in the mobile terminal apparatus, by signaling, a signal subjected to code division multiplexing among users is mapped to a particular RB (that is separated from the RB subjected to normal frequency multiplexing/time multiplexing) (see FIGS. 7(*a*) and 7(*b*)).

Figure 7:
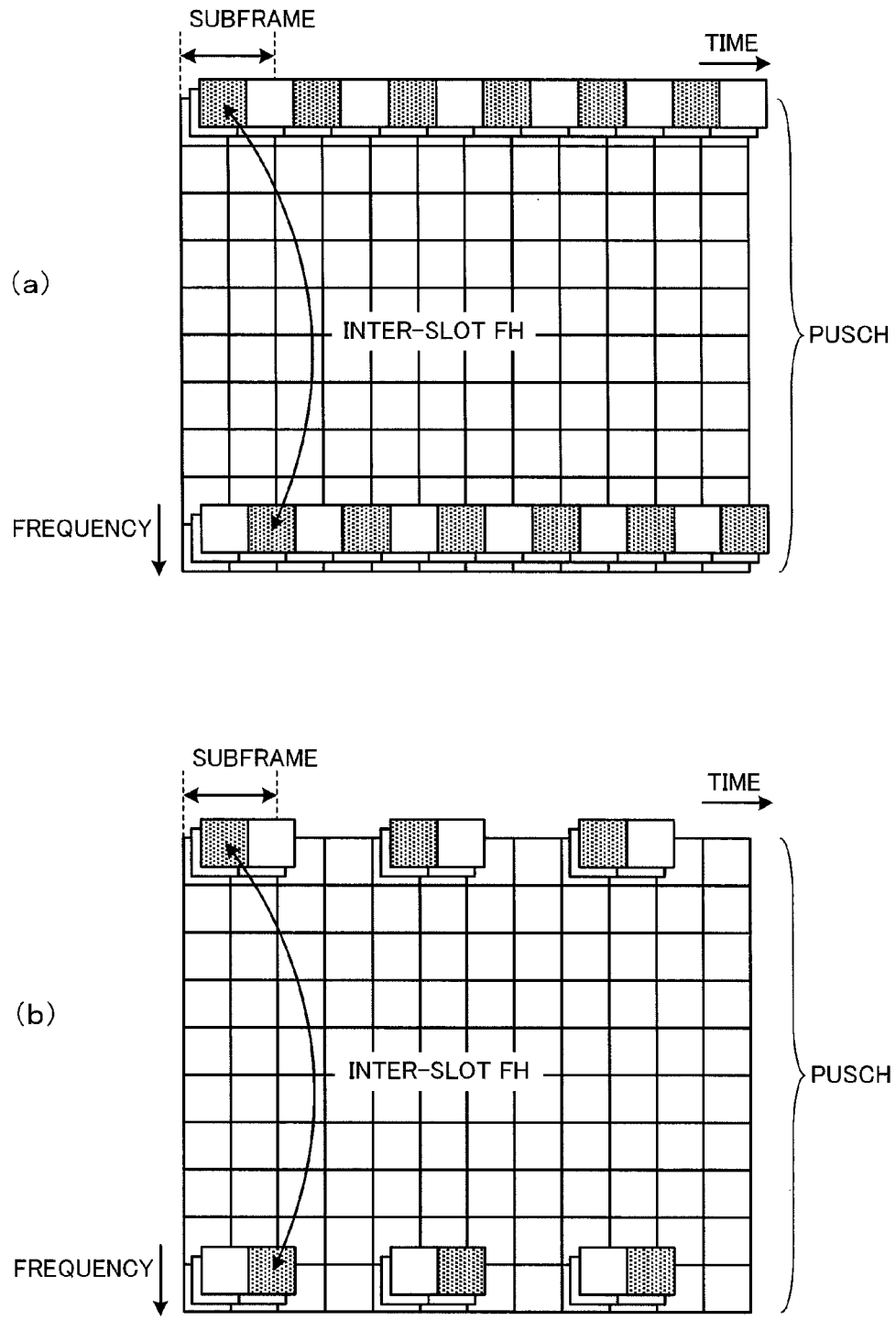
FIGS. 7(a) and 7(b) are diagrams to explain resource allocation of the PUSCH in the radio communication method according to the Embodiment of the invention.

Thus, in the case of using RBs for code division multiplexing in only a particular frequency band, RBs for code division multiplexing may be allocated consecutively in the time domain to be a code multiplexing dedicated band as shown in FIG. 7(*a*), or may be allocated in a discrete manner in the time domain as shown in FIG. 7(*b*).

Further, in the invention, control may be performed so as to switch application of code division multiplexing on the PUSCH targeted for data signals of fixed rate such as voice transmission adaptively corresponding to the status of traffic.

For example, when the traffic amount is relatively small, users are multiplexed by normal frequency division multiplexing/time division multiplexing (specified in the LTE system), and when the traffic amount increases, user multiplexing by the above-mentioned code division multiplexing is applied. In this case, the radio base station apparatus monitors a traffic amount in uplink, and when the traffic amount meets a predetermined requirement, for example, exceeds a predetermined threshold, switches from user multiplexing by frequency division multiplexing/time division multiplexing to user multiplexing by code division multiplexing. With the switching, the radio base station apparatus performs, on the mobile terminal apparatus, scheduling for allocating a data signal subjected to code division multiplexing to a particular RB and signaling of information (code sequence number) on the code sequence. In addition, for example, signaling is notified to all the users in a cell on the broadcast channel, as broadcast information notified at long intervals.

A radio communication method according to the invention will specifically be described below.

Embodiment 1

This Embodiment describes the case of combining and applying the block spreading method and non-orthogonal multiplexing method as code multiplexing.

Figure 8:
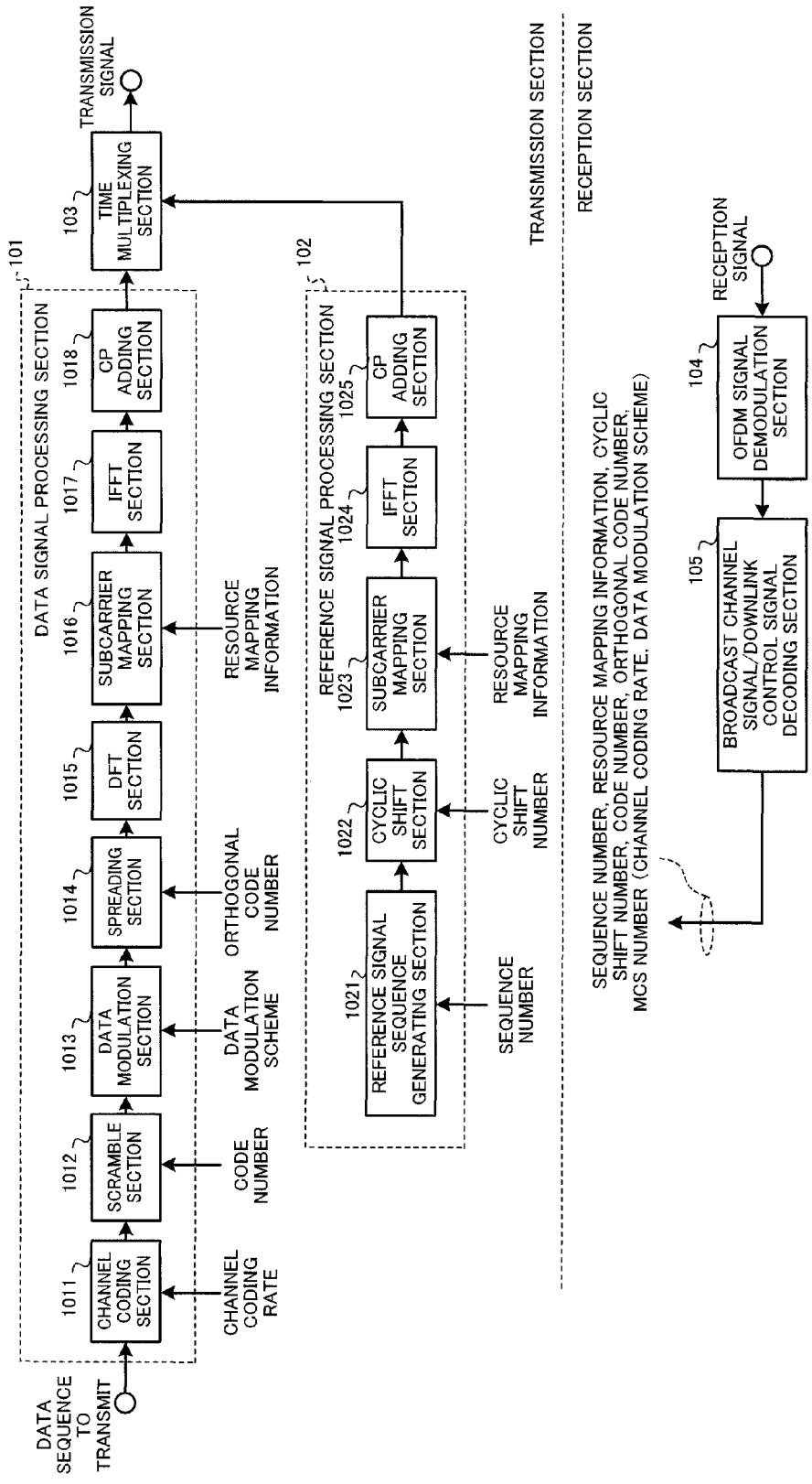
FIG. 8 is a diagram illustrating a schematic configuration of a mobile terminal apparatus according to Embodiment 1 of the invention.

FIG. 8 is a diagram illustrating a schematic configuration of a mobile terminal apparatus according to Embodiment 1 of the invention. The mobile terminal apparatus as shown in FIG. 8 is provided with a transmission section and a reception section. The transmission section is provided with a data signal processing section 101, reference signal processing section 102, and time multiplexing section 103 that time-multiplexes a data signal and a reference signal.

The data signal processing section 101 has a channel coding section 1011 that performs error correcting coding on a data sequence to transmit, a scramble section 1012 that performs scrambling processing on the coded data signal with a spreading code, a data modulation section 1013 that performs data modulation on the scrambled data signal, a spreading section 1014 that performs orthogonal spreading processing on the data-modulated data signal with an orthogonal code, a DFT (Discrete Fourier Transform) section 1015 that transforms the data signal in the time domain subjected to orthogonal spreading into the signal in the frequency domain, a subcarrier mapping section 1016 that maps the DFT-processed signal to subcarriers, an IFFT (Inverse Fast Fourier Transform) section 1017 that performs IFFT on the mapped signal, and a CP (Cyclic Prefix) adding section 1018 that adds a CP to the IFFT-processed signal.

The reference signal processing section 102 has a reference signal sequence generating section 1021 that generates a reference signal sequence associated with the sequence number, a cyclic shift section 1022 that cyclically shifts the reference signal sequence, a subcarrier mapping section 1023 that maps the cyclically-shifted signal to subcarriers, an IFFT section 1024 that performs IFFT on the mapped signal, and a CP adding section 1025 that adds a CP to the IFFT-processed signal.

The mobile terminal apparatus receives broadcast channel signals on the Broadcast Channel (BCH) and downlink control signals on the Physical Downlink Control Channel (PDCCH). The mobile terminal apparatus decodes the signals, and thereby obtains the sequence number of a reference signal, resource mapping information, the cyclic shift number, the code number of a spreading code, the orthogonal code number of an orthogonal code, and the MCS (Modulation and channel Coding Scheme: channel coding rate, data modulation scheme) number. Then, the sequence number is output to the reference signal sequence generating section 1021 of the reference signal processing section 102, the resource mapping information is output to the subcarrier mapping sections 1016, 1023, the cyclic shift number is output to the cyclic shift section 1022, the code number is output to the scramble section 1012, the orthogonal code number is output to the spreading section 1014, the channel coding rate associated with the MCS number is output to the channel coding section 1011, and the data modulation scheme associated with the MCS number is output to the data modulation section 1013.

The channel coding section 1011 performs error correcting coding on a data sequence to transmit, using the channel coding rate associated with the MCS number. The channel coding section 1011 outputs the data signal subjected to error correcting coding to the scramble section 1012.

The scramble section 1012 multiplies the channel-coded data signal by the spreading code associated with the code number to perform scrambling processing. The scramble section 1012 outputs the scrambling-processed data signal to the data modulation section 1013.

The data modulation section 1013 performs data modulation on the scrambled data signal with the data modulation scheme associated with the MCS number. The data modulation section 1013 outputs the data-modulated data signal to the spreading section 1014.

The spreading section 1014 multiplies the data-modulation data signal by the orthogonal code associated with the orthogonal code number to perform orthogonal spreading processing for block spreading. The spreading section 1014 outputs the data signal subjected to the orthogonal spreading processing to the DFT section 1015.

The DFT section 1015 transforms the data signal in the time domain subjected to the orthogonal spreading processing into the signal in the frequency domain. The DFT section 1015 outputs the DFT-processed data signal to the subcarrier mapping section 1016.

The subcarrier mapping section 1016 maps the DFT-processed data signal to subcarriers based on the resource mapping information. In this case, the data signal subjected to the processing (scrambling processing and/or orthogonal spreading processing) by the code multiplexing method is mapped to particular frequency domain (frequency domain dedicated to code multiplexing) as shown in FIGS. 7(a) and 7(b). The subcarrier mapping section 1016 outputs the subcarrier-mapped data signal to the IFFT section 1017.

The IFFT section 1017 performs IFFT on the subcarrier-mapped signal to transform into the signal in the time domain. The IFFT section 1017 outputs the IFFT-processed signal to the CP adding section 1018. The CP adding section 1018 adds a CP to the IFFT-processed signal. The CP adding section 1018 outputs the CP-added signal to the time multiplexing section 103.

The reference signal sequence generating section 1021 of the reference signal processing section 102 generates a reference signal sequence associated with the sequence number. The reference signal sequence generating section 1021 outputs the reference signal sequence to the cyclic shift section 1022. The cyclic shift section 1022 provides the reference signal sequence with a cyclic shift amount associated with the cyclic shift number. The cyclic shift section 1022 outputs the cyclically-shifted signal to the subcarrier mapping section 1023.

The subcarrier mapping section 1023 maps the signal in the frequency domain to subcarriers based on the resource mapping information. The subcarrier mapping section 1023 outputs the mapped reference signal to the IFFT section 1024. The IFFT section 1024 performs IFFT on the mapped signal to transform into the reference signal in the time domain. The IFFT section 1024 outputs the IFFT-processed reference signal to the CP adding section 1025. The CP adding section 1025 adds a CP to the IFFT-processed reference signal. The CP adding section 1025 outputs the CP-added reference signal to the time multiplexing section 103. The time multiplexing section 103 time-multiplexes the signal from the data signal processing section 101 and the reference signal from the reference signal processing section 102 to be a transmission signal including an uplink shared channel signal.

Thus, the mobile terminal apparatus performs the spreading processing on the data signal with a code (scramble code and/or orthogonal code) varying for each user, and transmits the spreading-processed data signal to the radio base station apparatus on the uplink shared channel.

The reception section has an OFDM signal demodulation section 104 that demodulates an OFDM signal, and a BCH (Broadcast Channel) signal/downlink control signal decoding section 105 that decodes a BCH signal and downlink control signal.

The OFDM signal demodulation section 104 receives a downlink OFDM signal to demodulate. In other words, the section 104 removes the CP from the downlink OFDM signal, performs fast Fourier transform, extracts subcarriers allocated the BCH signal or downlink control signal, and performs data demodulation. The OFDM signal demodulation section 104 outputs the data-demodulated signal to the BCH signal/downlink control signal decoding section 105.

The BCH signal/downlink control signal decoding section 105 decodes the data-demodulated signal, and obtains the sequence number, resource mapping information (including the resource block number), the cyclic shift number, the code number (spreading code number), the orthogonal code number, and the MCS number (channel coding rate, data modulation scheme). The BCH signal/downlink control signal decoding section 105 outputs the sequence number to the reference signal sequence generating section 1021, outputs the resource mapping information to the subcarrier mapping sections 1016, 1023, outputs the cyclic shift number to the cyclic shift section 1022, outputs the code number to the scramble section 1012, outputs the orthogonal code number to the spreading section 1014, outputs the MCS number (channel coding rate) to the channel coding section 1011, and further, outputs the MCS number (data modulation scheme) to the data modulation section 1013.

Figure 9:
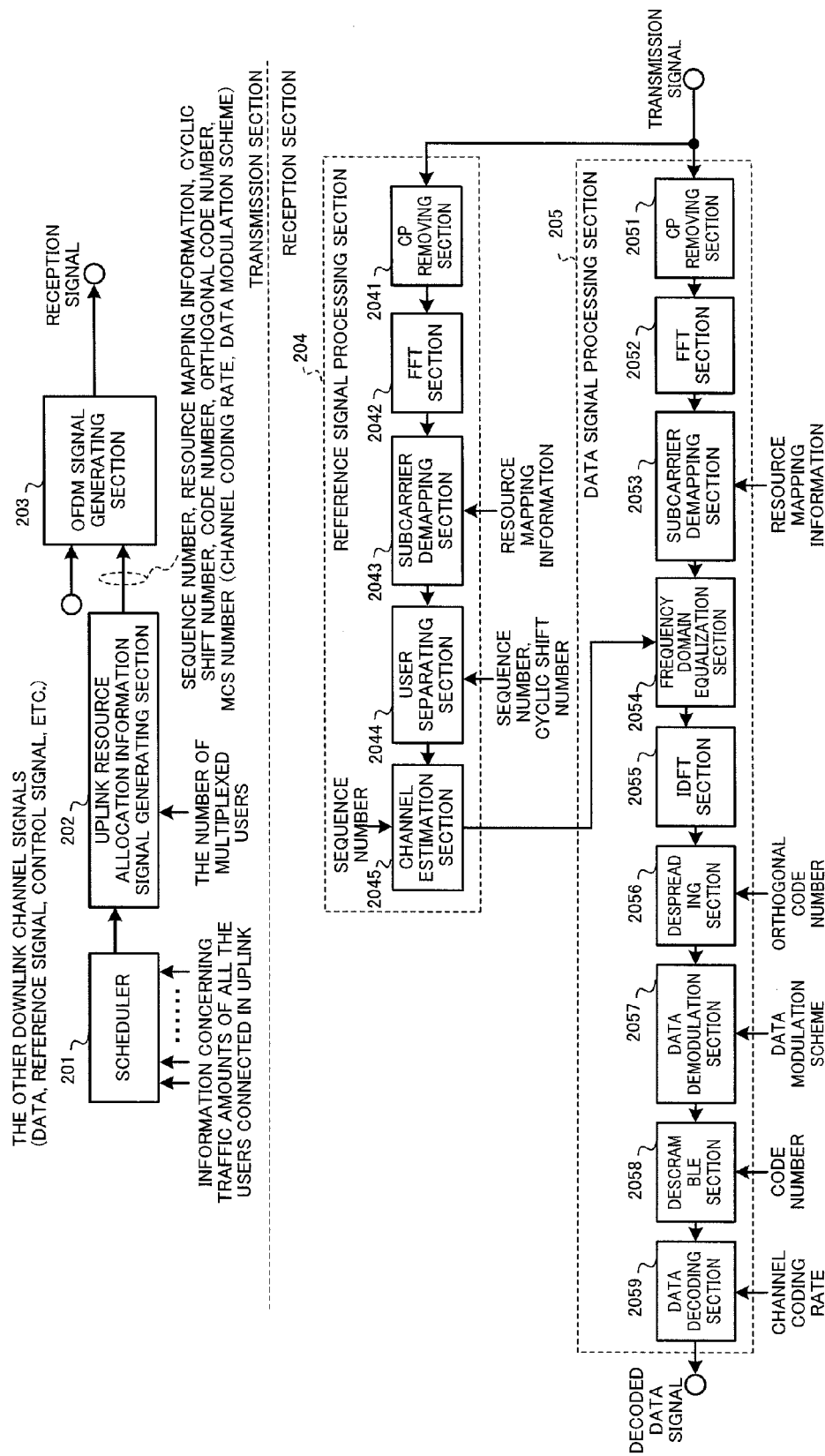
FIG. 9 is a diagram illustrating a schematic configuration of a radio base station apparatus according to Embodiment 1 of the invention.

FIG. 9 is a diagram illustrating a schematic configuration of a radio base station apparatus according to Embodiment 1 of the invention. The radio base station apparatus as shown in FIG. 9 is provided with a transmission section and a reception section. The transmission section has a scheduler 201, uplink resource allocation information signal generating section 202, and OFDM signal generating section 203 that multiplexes other downlink channel signals and uplink resource allocation information signal to generate an OFDM signal. The other downlink channel signals include data, reference signal, control signal and the like, and the uplink resource allocation information signal includes the sequence number, the resource mapping information, the cyclic shift number, the code number, the orthogonal code number, and the MCS number (channel coding rate, data modulation scheme).

In addition, the sequence number, the resource mapping information, the cyclic shift number, the code number, the orthogonal code number, and the MCS number (channel coding rate, data modulation scheme) may be transmitted to the mobile terminal apparatus on the BCH, or may be transmitted to the mobile terminal apparatus on the downlink control channel (PDCCH: Physical Downlink Control Channel). Alternatively, the sequence number, the resource mapping information, the cyclic shift number, the code number, the orthogonal code number, and the MCS number (channel coding rate, data modulation scheme) may be notified to the mobile terminal apparatus by a higher layer.

The scheduler 201 allocates radio resources of the uplink shared channel. The scheduler 201 is notified of information concerning traffic amounts of all the users connected in uplink. Accordingly, the scheduler 201 switches the user multiplexing method from frequency multiplexing/time multiplexing to code multiplexing based on the traffic amount in uplink. For example, the scheduler 201 monitors the traffic amount in uplink, and when the traffic amount exceeds some threshold, switches the user multiplexing method from frequency multiplexing/time multiplexing to code multiplexing to perform scheduling for code multiplexing. In other words, the scheduler 201 allocates radio resources of the uplink shared channel so as to use frequency domain dedicated to code multiplexing as shown in FIGS. 7(*a*) and 7(*b*) (when the code multiplexing processing is applied to the user multiplexing processing, the data signal is allocated to particular resource blocks.) Meanwhile, when the traffic amount in uplink is some threshold or less, the scheduler 201 applies frequency multiplexing/time multiplexing to the user multiplexing method to perform scheduling. Thus, the scheduler 201 determines whether or not to apply code multiplexing to user multiplexing corresponding to the traffic amount in uplink.

The uplink resource allocation information signal generating section 202 generates the sequence number, the resource mapping information, the cyclic shift number, the code number, the orthogonal code number, and the MCS number (channel coding rate, data modulation scheme), and outputs these pieces of information to the OFDM signal generating section 203.

The OFDM signal generating section 203 maps a downlink signal including the other downlink channel signals and the uplink resource allocation information signal to subcarriers, performs Inverse Fast Fourier Transform (IFFT), adds the CP, and thereby generates a downlink transmission signal.

The reception section is provided with a reference signal processing section 204 and a data signal processing section 205. The reception section receives a signal in which are mixed data signals from a plurality of users subjected to the spreading processing with codes (scramble code and/or orthogonal code) varying for each user via the uplink shared channel.

The reference signal processing section 204 has a CP removing section 2041 that removes a CP from a reception signal, an FFT (Fast Fourier Transform) section 2042 that performs FFT on the CP-removed reception signal, a subcarrier demapping section 2043 that demaps the FFT-processed signal, a user separating section 2044 that separates into reference signals for each user, and a channel estimation section 2045 that estimates a channel variation using the user-separated reference signal.

The data signal processing section 205 has a CP removing section 2051 that removes a CP from a reception signal, an FFT section 2052 that performs FFT on the CP-removed reception signal, a subcarrier demapping section 2053 that demaps the FFT-processed signal, a frequency domain equalization section 2054 that compensates the subcarrier-demapped data signal for the channel variation, an IDFT (Inverse Discrete Fourier Transform) section 2055 that performs IDFT on the signal compensated for the channel variation, a despreading section 2056 that performs despreading processing on the IDFT-processed signal with an orthogonal code, a data demodulation section 2057 that performs data demodulation on the despread data signal, a descramble section 2058 that descrambles the data-demodulated signal with a spreading code, and a data decoding section 2059 that performs data decoding on the descrambled data signal.

With respect to the reference signal, the CP removing section 2041 of the reference signal processing section 204 removes a portion corresponding to the CP from the reception signal, and extracts an effective signal portion. The CP removing section 2041 outputs the CP-removed signal to the FFT section 2042. The FFT section 2042 performs FFT on the CP-removed signal to transform into the signal in the frequency domain. The FFT section 2042 outputs the FFT-processed signal to the subcarrier demapping section 2043. The subcarrier demapping section 2043 extracts the reference signal from the signal in the frequency domain using the resource mapping information. The subcarrier demapping section 2043 outputs the reference signal to the user separating section 2044.

The user separating section 2044 separates reference signals for each user subjected to orthogonal multiplexing by the cyclic shift number, using the sequence number and cyclic shift number. The user separating section 2044 outputs the user-separated reference signal to the channel estimation section 2045. The channel estimation section 2045 performs channel estimation using the user-separated reference signal, using the sequence number. In other words, the section 2045 compares the known subcarrier obtained from the sequence number with the subcarrier of the user-separated reference signal to estimate a channel variation. The channel estimation section 2045 outputs the estimated channel variation to the frequency domain equalization section 2054 of the data signal processing section 205.

With respect to the data signal, the CP removing section 2051 of the data signal processing section 205 removes a portion corresponding to the CP from the reception signal, and extracts an effective signal portion. The CP removing section 2051 outputs the CP-removed signal to the FFT section 2052. The FFT section 2052 performs FFT on the CP-removed signal to transform into the signal in the frequency domain. The FFT section 2052 outputs the FFT-processed signal to the subcarrier demapping section 2053. The subcarrier demapping section 2053 extracts the data signal from the signal in the frequency domain using the resource mapping information. The subcarrier demapping section 2053 outputs the data signal to the frequency domain equalization section 2054.

The frequency domain equalization section 2054 compensates the subcarrier-demapped data signal for the channel variation estimated in the channel estimation section 2045. The frequency domain equalization section 2054 outputs the equalized data signal to the IDFT section 2055. The IDFT section 2055 transforms the signal in the frequency domain into the signal in the time domain. The IDFT section 2055 outputs the IDFT-processed signal to the despreading section 2056.

The despreading section 2056 multiplies the IDFT-processed data signal by the orthogonal code associated with the orthogonal code number to perform the despreading processing. The despreading section 2056 outputs the despreading-processed data signal to the data demodulation section 2057.

The data demodulation section 2057 performs data demodulation on the IDFT-processed data signal or the despreading-processed data signal with the data modulation scheme associated with the MCS number. The data demodulation section 2057 outputs the data-demodulated data signal to the descramble section 2058.

The descramble section 2058 multiplies the data-demodulated data signal by the spreading code associated with the code number to perform descrambling processing. The descramble section 2058 outputs the descrambling-processed data signal to the data decoding section 2059.

The data decoding section 2059 performs data decoding on the descrambled data signal to output as the data signal. In this way, the code-multiplexed data signal is subjected to user division by the despreading processing and/or descrambling processing to be data signals for each user.

Described is a radio communication method according to the invention using the radio base station apparatus and mobile terminal apparatus having the above-mentioned configurations. In the radio communication method according to the invention, the mobile terminal apparatus performs spreading processing for multiplying a data signal by a code varying for each user, and transmits the spreading-processed data signal to the radio base station apparatus on the uplink shared channel, and the radio base station apparatus receives the data signal, and user-separates desired user signals from a reception signal in which is mixed a plurality of users multiplied by spreading codes varying for each user to be data signals for each user.

First, the scheduler 201 in the radio base station apparatus monitors the traffic amount in uplink, and when the traffic amount is a predetermined threshold or less, applies frequency multiplexing/time multiplexing to user multiplexing. Meanwhile, when the traffic amount in uplink exceeds the predetermined threshold, the scheduler 201 applies code multiplexing to user multiplexing.

The OFDM signal generating section 203 multiplexes the uplink resource allocation information including the sequence number, the resource mapping information (including the resource block number), the cyclic shift number, the MCS number, and when necessary, the code number and the orthogonal code number, and the other downlink channel signals to be an OFDM signal, and the OFDM signal is transmitted as a downlink transmission signal.

In the mobile terminal apparatus, the OFDM signal demodulation section 104 receives the downlink OFDM signal to demodulate. Then, the broadcast channel signal/downlink control signal decoding section 105 extracts the sequence number, the resource mapping information, the cyclic shift number, the MCS number, and when necessary, the code number and the orthogonal code number, outputs the sequence number to the reference signal sequence generating section 1021, outputs the resource mapping information to the subcarrier mapping sections 1016, 1023, outputs the cyclic shift number to the cyclic shift section 1022, outputs the MCS number (channel coding rate) to the channel coding section 1011, outputs the MCS number (data modulation scheme) to the data modulation section 1013, outputs the code number to the scramble section 1012, and further, outputs the orthogonal code number to the spreading section 1014.

The channel coding section 1011 performs channel coding on a data sequence to transmit with the channel coding rate associated with the MCS number broadcast from the radio base station apparatus. In addition, in the case of the fixed rate such as a voice signal, channel coding is performed with a beforehand determined channel coding rate.

Next, in the case that code multiplexing is applied to user multiplexing, when a predetermined requirement is met, for example, when the number of multiplexed users exceeds a predetermined threshold, the scramble section 1012 performs scrambling processing on the channel-coded data signal with the spreading code associated with the code number broadcast from the radio base station apparatus.

Then, the data modulation section 1013 performs data modulation on the channel-coded data signal or scrambled data signal with the data modulation scheme associated with the MCS number broadcast from the radio base station apparatus.

Subsequently, when code multiplexing is applied to user multiplexing, the spreading section 1014 performs spreading processing on the data-modulated data signal with the orthogonal code associated with the orthogonal code number broadcast from the radio base station apparatus. When code multiplexing is not applied to user multiplexing, the data-modulated data signal is output to the DFT section 1015.

Then, the DFT section 1015 performs DFT on the data-modulated data signal or spreading-processed data signal, and the DFT-processed data signal is mapped in the subcarrier mapping section 1016 based on the resource mapping information. In this case, as shown in FIGS. 7(*a*) and 7(*b*), the data signal to which is applied code multiplexing is mapped to particular frequency domain. The subcarrier-mapped signal is transformed into the signal in the time domain by IFFT in the IFFT section 1017, and the CP is added to the signal in the CP adding section 1018.

Meanwhile, the cyclic shift section 1022 in the reference signal processing section 102 provides each of a plurality of subcarriers associated with the reference signal sequence with phase rotation. The cyclically-shifted signal is mapped in the subcarrier mapping section 1023 based on the resource mapping information. The subcarrier-mapped signal is transformed into the signal in the time domain by IFFT in the IFFT section 1024, and the CP is added to the signal in the CP adding section 1025.

Thus obtained data signal and reference signal are time-multiplexed, and the uplink shared channel signal in which orthogonal multiplexing (block spreading) and non-orthogonal multiplexing is combined and applied is transmitted to the radio base station apparatus. The radio base station apparatus receives the uplink shared channel signal that is orthogonally multiplexed among users.

In the radio base station apparatus, with respect to the reference signal, the CP removing section 2041 removes the CP. Next, the FFT section 2042 performs FFT on the CP-removed signal to be the signal in the frequency domain, and the subcarrier demapping section 2043 demaps from subcarriers based on the resource mapping information. The demapped reference signal is separated into reference signals for each user in the user separating section 2044. Then, the channel estimation section 2045 estimates a channel variation using the user-separated reference signal.

With respect to the data signal, the CP removing section 2051 removes the CP. Next, the FFT section 2052 performs FFT on the CP-removed signal to be the signal in the frequency domain, and the subcarrier demapping section 2053 demaps from subcarriers based on the resource mapping information. The frequency domain equalization section 2054 compensates the demapped data signal for the channel variation estimated in the channel estimation section 2045, and subsequently, the signal is subjected to IDFT in the IDFT section 2055 and is transformed into the signal in the time domain.

Next, when code multiplexing is applied to user multiplexing, the despreading section 2056 performs despreading processing on the IDFT-processed data signal with the orthogonal code (orthogonal code used in the mobile terminal apparatus) associated with the orthogonal code number.

Meanwhile, when code multiplexing is not applied to user multiplexing, the IDFT-processed data signal is output to the data demodulation section 2057.

Subsequently, the data demodulation section 2057 performs data demodulation on the despread data signal or the IDFT-processed data signal with the data modulation scheme (data modulation scheme used in the mobile terminal apparatus) associated with the MCS number.

Then, the descramble section 2058 performs descrambling processing on the data-demodulated data signal, and outputs the descrambled data signal to the data decoding section 2059. Next, the data decoding section 2059 decodes the descrambled data signal, and obtains the data signal.

(Embodiment 2)

This Embodiment describes the case of combining and applying the cyclic shift method and non-orthogonal multiplexing method as code multiplexing.

Figure 10:
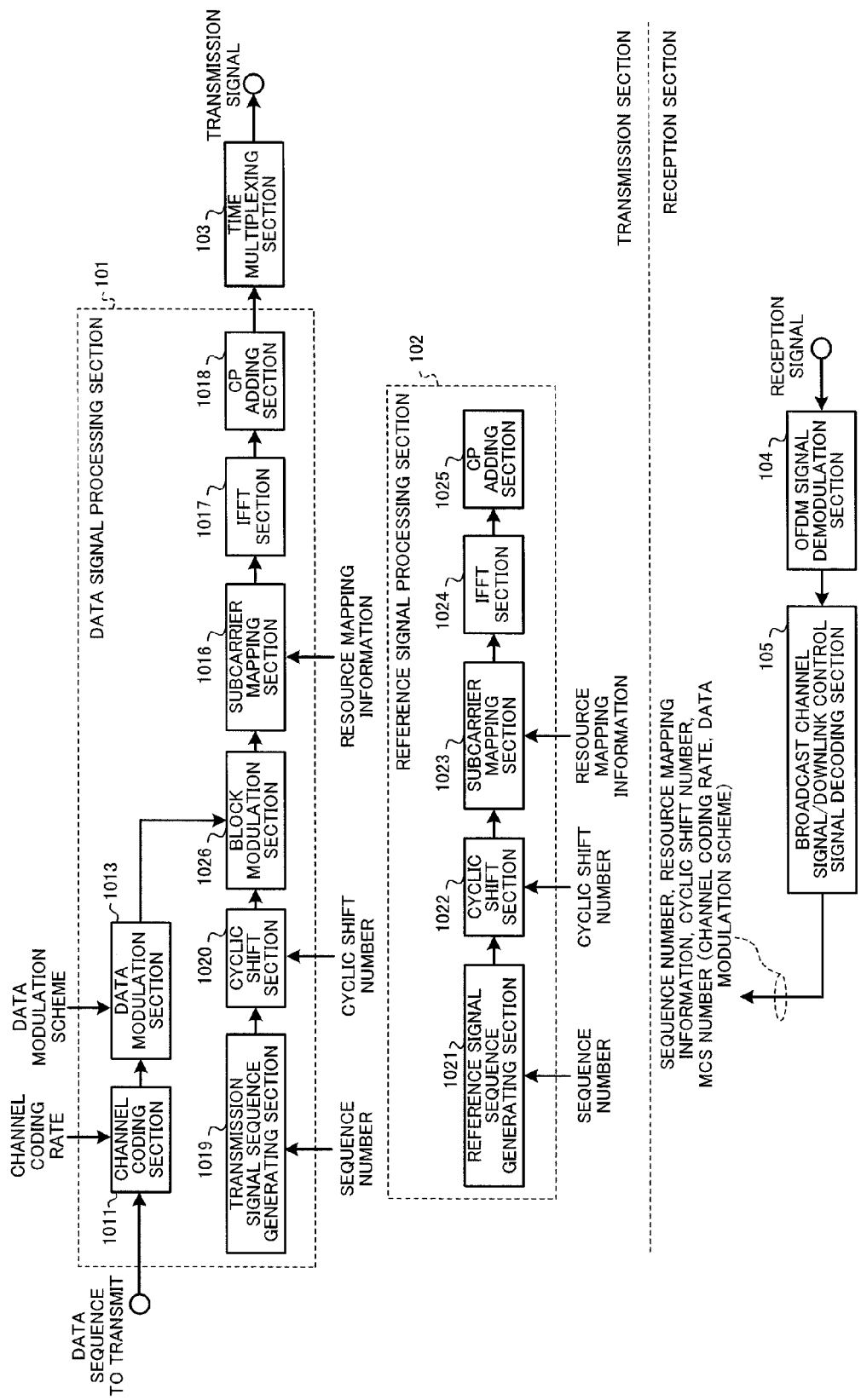
FIG. 10 is a diagram illustrating a schematic configuration of a mobile terminal apparatus according to Embodiment 2 of the invention.

FIG. 10 is a diagram illustrating a schematic configuration of a mobile terminal apparatus according to Embodiment 2 of the invention. The mobile terminal apparatus as shown in FIG. 10 is provided with a transmission section and a reception section. The transmission section is provided with a data signal processing section 101, reference signal processing section 102, and time multiplexing section 103 that time-multiplexes a data signal and a reference signal.

The data signal processing section 101 has a channel coding section 1011 that performs error correcting coding on a data sequence to transmit, a data modulation section 1013 that performs data modulation on the channel-coded data signal, a transmission signal sequence generating section 1019 that generates a transmission signal sequence associated with the sequence number, a cyclic shift section 1020 that cyclically shifts the transmission signal sequence, a block modulation section 1026 that performs block modulation on the transmission signal sequence with the data-modulated signal, a subcarrier mapping section 1016 that maps the block-modulated signal to subcarriers, an IFFT section 1017 that performs IFFT on the mapped signal, and a CP adding section 1018 that adds a CP to the IFFT-processed signal.

The reference signal processing section 102 has a reference signal sequence generating section 1021 that generates a reference signal sequence associated with the sequence number, a cyclic shift section 1022 that cyclically shifts the reference signal sequence, a subcarrier mapping section 1023 that maps the cyclically-shifted signal to subcarriers, an IFFT section 1024 that performs IFFT on the mapped signal, and a CP adding section 1025 that adds a CP to the IFFT-processed signal.

The mobile terminal apparatus receives broadcast channel signals on the Broadcast Channel and downlink control signals on the downlink control channel. The mobile terminal apparatus decodes the signals, and thereby obtains the sequence number of a transmission signal, the sequence number of a reference signal, resource mapping information, the cyclic shift number, and the MCS (channel coding rate, data modulation scheme) number. Then, the sequence number is output to the reference signal sequence generating section 1021 of the reference signal processing section 102, and the transmission signal sequence generating section 1019 of the data signal processing section 101, the resource mapping information is output to the subcarrier mapping sections 1016, 1023, the cyclic shift number is output to the cyclic shift sections 1020, 1022, the channel coding rate associated with the MCS number is output to the channel coding section 1011, and the data modulation scheme associated with the MCS number is output to the data modulation section 1013.

The channel coding section 1011 performs error correcting coding on the data sequence to transmit, using the channel coding rate associated with the MCS number. The channel coding section 1011 outputs the data signal subjected to error correcting coding to the data modulation section 1013.

The data modulation section 1013 performs data modulation on the channel-coded data signal with the data modulation scheme associated with the MCS number. The data modulation section 1013 outputs the data-modulated data signal to the block modulation section 1026.

In the case where code multiplexing is applied, when the number of multiplexed users in uplink is relatively low (FIGS. 6(*a*), 6(*b*)), since users are multiplexed by the orthogonal multiplexing method, a single sequence number is broadcast from the radio base station apparatus. The transmission signal sequence generating section 1019 generates a transmission signal sequence associated with the single sequence number. In addition, when the traffic amount in uplink is few, since code multiplexing is not applied and users are multiplexed by frequency multiplexing/time multiplexing, the radio base station apparatus broadcasts neither the sequence number nor the cyclic shift number, the sequence number is not output to the transmission signal sequence generating section 1019, and the cyclic shift number is not output to the cyclic shift section 1020. Meanwhile, in the case where code multiplexing is applied, when the number of multiplexed users in uplink is relatively high (FIG. 6(*c*)) multiplexing method and non-orthogonal multiplexing method, a plurality of sequence numbers is broadcast from the radio base station apparatus. The transmission signal sequence generating section 1019 generates a plurality of transmission signal sequences associated with the plurality of sequence numbers. The transmission signal sequence generating section 1019 outputs the transmission signal sequences to the cyclic shift section 1020.

The block modulation section 1026 performs block modulation on the transmission signal sequence with the data-modulated data signal on a block basis corresponding to 1 SC-FDMA. The subcarrier mapping section 1016 maps the block-modulated data signal to subcarriers based on the resource mapping information. In this case, the data signal subjected to the process ing (scrambling process ing and/or orthogonal spreading processing) by the code multiplexing method is mapped to particular frequency domain (frequency domain dedicated to code multiplexing) as shown in FIGS. 7(*a*) and 7(*b*). The subcarrier mapping section 1016 outputs the subcarrier-mapped data signal to the IFFT section 1017.

The IFFT section 1017 performs IFFT on the subcarrier-mapped signal to transform into the signal in the time domain. The IFFT section 1017 outputs the IFFT-processed signal to the CP adding section 1018. The CP adding section 1018 adds a CP to the IFFT-processed signal. The CP adding section 1018 outputs the CP-added signal to the time multiplexing section 103.

The reference signal sequence generating section 1021 of the reference signal processing section 102 generates a reference signal sequence associated with the sequence number. The reference signal sequence generating section 1021 outputs the reference signal sequence to the cyclic shift section 1022. The cyclic shift section 1022 provides the reference signal sequence with a cyclic shift amount associated with the cyclic shift number. The cyclic shift section 1022 outputs the cyclically-shifted signal to the subcarrier mapping section 1023.

The subcarrier mapping section 1023 maps the signal in the frequency domain to subcarriers based on the resource mapping information. The subcarrier mapping section 1023 outputs the mapped reference signal to the IFFT section 1024.

The IFFT section 1204 performs IFFT on the mapped signal to transform into the reference signal in the time domain. The IFFT section 1024 outputs the IFFT-processed reference signal to the CP adding section 1025. The CP adding section 1025 adds a CP to the IFFT-processed reference signal. The CP adding section 1025 outputs the CP-added reference signal to the time multiplexing section 103. The time multiplexing section 103 time-multiplexes the signal from the data signal processing section 101 and the reference signal from the reference signal processing section 102 to be a transmission signal including an uplink shared channel signal.

Thus, the mobile terminal apparatus performs the code multiplexing processing on the data signal with a code (cyclic shift amount) varying for each user, and transmits the data signal subjected to the code multiplexing processing to the radio base station apparatus on the uplink shared channel.

The reception section has an OFDM signal demodulation section 104 that demodulates an OFDM signal, and a broadcast channel signal/downlink control signal decoding section 105 that decodes a broadcast channel signal and downlink control signal.

The OFDM signal demodulation section 104 receives a downlink OFDM signal to demodulate. In other words, the section 104 removes the CP from the downlink OFDM signal, performs fast Fourier transform, extracts subcarriers allocated the BCH signal or downlink control signal, and performs data demodulation. The OFDM signal demodulation section 104 outputs the data-demodulated signal to the BCH signal/downlink control signal decoding section 105.

The BCH signal/downlink control signal decoding section 105 decodes the data-demodulated signal, and obtains the sequence number, the resource mapping information (including the resource block number), the cyclic shift number, and the MCS number (channel coding rate, data modulation scheme). The BCH signal/downlink control signal decoding section 105 outputs the sequence number to the reference signal sequence generating section 1021 and the transmission signal sequence generating section 1019, outputs the resource mapping information to the subcarrier mapping sections 1016, 1023, outputs the cyclic shift number to the cyclic shift sections 1020, 1022, outputs the MCS number (channel coding rate) to the channel coding section 1011, and further, outputs the MCS number (data modulation scheme) to the data modulation section 1013.

Figure 11:
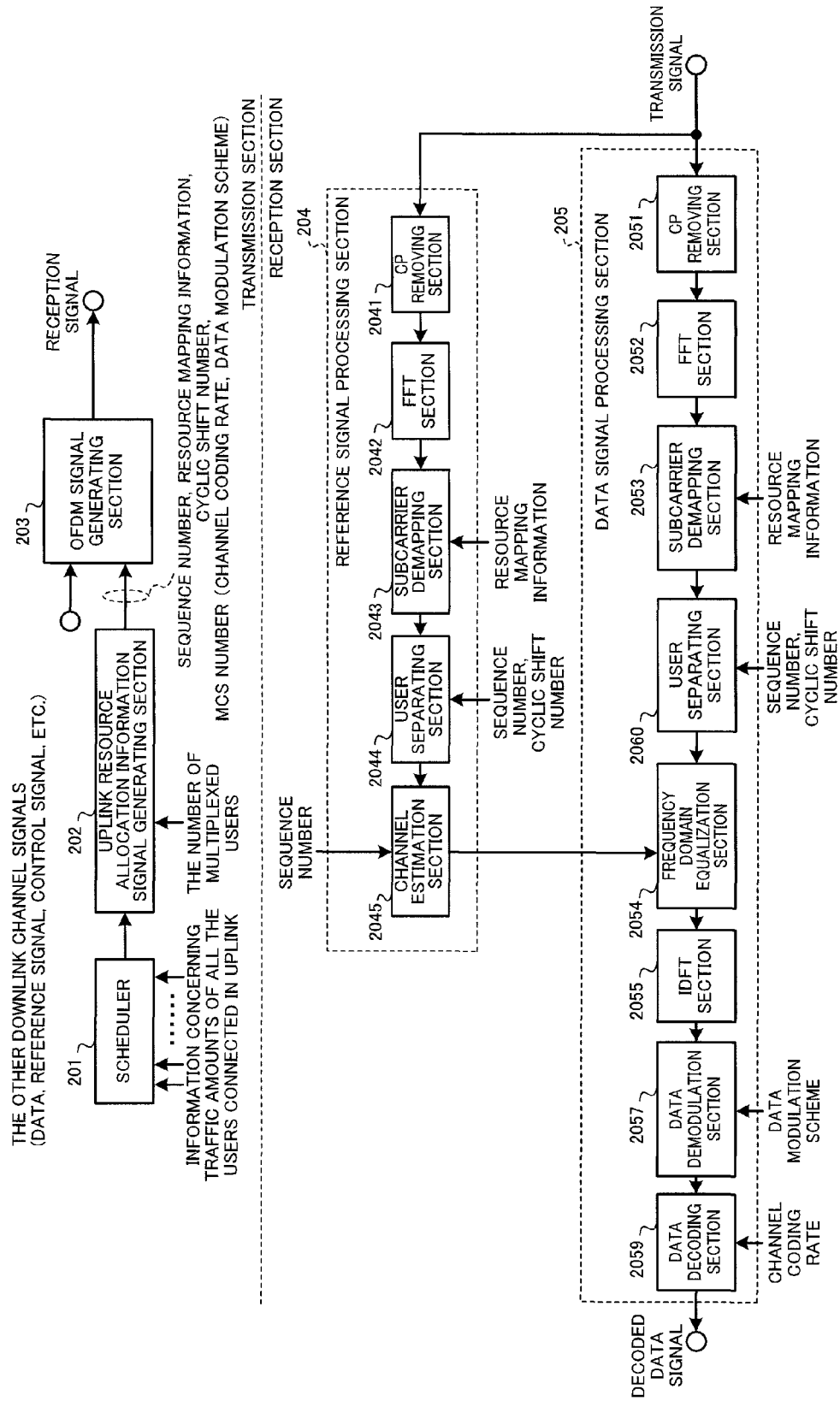
FIG. 11 is a diagram illustrating a schematic configuration of a radio base station apparatus according to Embodiment 2 of the invention.

FIG. 11 is a diagram illustrating a schematic configuration of a radio base station apparatus according to Embodiment 2 of the invention. The radio base station apparatus as shown in FIG. 11 is provided with a transmission section and a reception section. The transmission section has a scheduler 201, uplink resource allocation information signal generating section 202, and an OFDM signal generating section 203 that multiplexes other downlink channel signals and uplink resource allocation information signal to generate an OFDM signal. The other downlink channel signals include data, reference signal, control signal and the like, and the uplink resource allocation information signal includes the sequence number, the resource mapping information, the cyclic shift number, and the MCS number (channel coding rate, data modulation scheme).

In addition, the sequence number, the resource mapping information, the cyclic shift number, and the MCS number (channel coding rate, data modulation scheme) may be transmitted to the mobile terminal apparatus on the BCH, or may be transmitted to the mobile terminal apparatus on the downlink control channel. Alternatively, the sequence number, the resource mapping information, the cyclic shift number, and the MCS number (channel coding rate, data modulation scheme) may be notified to the mobile terminal apparatus by a higher layer.

The scheduler 201 allocates radio resources of the uplink shared channel. The scheduler 201 is notified of information concerning traffic amounts of all the users connected in uplink. Accordingly, the scheduler 201 switches the user multiplexing method from frequency multiplexing/time multiplexing to code multiplexing based on the traffic amount in uplink. For example, the scheduler 201 monitors the traffic amount in uplink, and when the traffic amount exceeds some threshold, switches the user multiplexing method from frequency multiplexing/time multiplexing to code multiplexing to perform scheduling for code multiplexing. In other words, the scheduler 201 allocates radio resources of the uplink shared channel so as to use frequency domain dedicated to code multiplexing as shown in FIGS. 7(a) and 7(b) (when the code multiplexing processing is applied to the user multiplexing processing, the data signal is allocated to particular resource blocks.) Meanwhile, when the traffic amount in uplink is some threshold or less, the scheduler 201 applies frequency multiplexing/time multiplexing to the user multiplexing method to perform scheduling. Thus, the scheduler 201 determines whether or not to apply code multiplexing to user multiplexing corresponding to the traffic amount in uplink.

The uplink resource allocation information signal generating section 202 generates the sequence numbers (the transmission signal sequence number, the reference signal sequence number), the resource mapping information, the cyclic shift number, and the MCS number (channel coding rate, data modulation scheme), and outputs these pieces of information to the OFDM signal generating section 203. The uplink resource allocation information signal generating section 202 determines whether to apply orthogonal multiplexing to code multiplexing or to combine non-orthogonal multiplexing with orthogonal multiplexing to apply corresponding to the number of multiplexed users. This determination is made, for example, by making a threshold determination on the number of multiplexed users. In other words, the uplink resource allocation information signal generating section 202 receives information of the number of multiplexed users, and based on the information of the number of multiplexed users, determines whether to generate a single transmission sequence number or a plurality of transmission signal sequence numbers. More specifically, in the case where code multiplexing is applied to user multiplexing, when the number of multiplexed users is relatively low (FIGS. 6(a), 6(b)), the uplink resource allocation information signal generating section 202 selects a single transmission signal sequence number, and when the number of multiplexed users is relatively high (FIG. 6(c)), selects a plurality of transmission signal sequence numbers.

The OFDM signal generating section 203 maps a downlink signal including the other downlink channel signals and the uplink resource allocation information signal to subcarriers, performs IFFT, adds the CP, and thereby generates a downlink transmission signal.

The reception section is provided with a reference signal processing section 204 and a data signal processing section 205. The reception section receives a data signal subjected to the code multiplexing processing with codes (cyclic shift amounts) varying for each user via the uplink shared channel.

The reference signal processing section 204 has a CP removing section 2041 that removes a CP from a reception signal, an FFT section 2042 that performs FFT on the CP-removed reception signal, a subcarrier demapping section 2043 that demaps the FFT-processed signal, a user separating section 2044 that separates into reference signals for each user, and a channel estimation section 2045 that estimates a channel variation using the user-separated reference signal.

The data signal processing section 205 has a CP removing section 2051 that removes a CP from a reception signal, an FFT section 2052 that performs FFT on the CP-removed reception signal, a subcarrier demapping section 2053 that demaps the FFT-processed signal, a user separating section 2060 that separates into data signals for each user, a frequency domain equalization section 2054 that compensates the subcarrier-demapped data signal for the channel variation, an IDFT section 2055 that performs IDFT on the signal compensated for the channel variation, a data demodulation section 2057 that performs data demodulation on the IDFT-processed data signal, and a data decoding section 2059 that performs data decoding on the data-demodulated data signal.

With respect to the reference signal, the CP removing section 2041 of the reference signal processing section 204 removes a portion corresponding to the CP from the reception signal, and extracts an effective signal portion. The CP removing section 2041 outputs the CP-removed signal to the FFT section 2042. The FFT section 2042 performs FFT on the CP-removed signal to transform into the signal in the frequency domain. The FFT section 2042 outputs the FFT-processed signal to the subcarrier demapping section 2043. The subcarrier demapping section 2043 extracts the reference signal from the signal in the frequency domain using the resource mapping information. The subcarrier demapping section 2043 outputs the reference signal to the user separating section 2044.

The user separating section 2044 separates reference signals for each user subjected to orthogonal multiplexing by the cyclic shift, using the sequence number and cyclic shift number. The user separating section 2044 outputs the user-separated reference signal to the channel estimation section 2045. The channel estimation section 2045 performs channel estimation using the user-separated reference signal, using the sequence number. In other words, the section 2045 compares the known subcarrier obtained from the sequence number with the subcarrier of the user-separated reference signal to estimate a channel variation. The channel estimation section 2045 outputs the estimated channel variation to the frequency domain equalization section 2054 of the data signal processing section 205.

With respect to the data signal, the CP removing section 2051 of the data signal processing section 205 removes a portion corresponding to the CP from the reception signal, and extracts an effective signal portion. The CP removing section 2051 outputs the CP-removed signal to the FFT section 2052. The FFT section 2052 performs FFT on the CP-removed signal to transform into the signal in the frequency domain. The FFT section 2052 outputs the FFT-processed signal to the subcarrier demapping section 2053. The subcarrier demapping section 2053 extracts the data signal from the signal in the frequency domain using the resource mapping information. The subcarrier demapping section 2053 outputs the data signal to the user separating section 2060.

The user separating section 2060 separates reference signals for each user subjected to orthogonal multiplexing by the cyclic shift, using the transmission signal sequence associated with the transmission signal sequence number and the cyclic shift amount associated with the cyclic shift number. The user separating section 2060 outputs the user-separated data signal to the frequency domain equalization section 2054. When orthogonal multiplexing is only applied, the user separating section 2060 performs user separation using a single transmission signal sequence. Meanwhile, when orthogonal multiplexing and non-orthogonal multiplexing is combined and applied, the user separating section 2060 performs user separation using a plurality of transmission signal sequences. In addition, when code multiplexing is not applied, the demapped data signal is output to the frequency domain equalization section 2054.

The frequency domain equalization section 2054 compensates the user-separated data signal or the subcarrier-demapped data signal for the channel variation estimated in the channel estimation section 2045. The frequency domain equalization section 2054 outputs the equalized data signal to the IDFT section 2055. The IDFT section 2055 transforms the signal in the frequency domain into the signal in the time domain. The IDFT section 2055 outputs the IDFT-processed signal to the data demodulation section 2057.

The data demodulation section 2057 performs data demodulation on the IDFT-processed data signal or the despreading-processed data signal with the data modulation scheme associated with the MCS number. The data demodulation section 2057 outputs the data-demodulated data signal to the data decoding section 2059. The data decoding section 2059 performs data decoding on the data-demodulated data signal to output as the data signal. In this way, the code-multiplexed data signal is subjected to user division to be data signals for each user.

Described is a radio communication method according to the invention using the radio base station apparatus and mobile terminal apparatus having the above-mentioned configurations.

First, the scheduler 201 in the radio base station apparatus monitors the traffic amount in uplink, and when the traffic amount is a predetermined threshold or less, applies frequency multiplexing/time multiplexing to user multiplexing. In this case, the uplink resource allocation information signal does not include the transmission signal sequence number. In other words, in this case, the transmission signal sequence number is not notified to the mobile terminal apparatus. Meanwhile, when the traffic amount in uplink exceeds the predetermined threshold, the scheduler 201 applies code multiplexing to user multiplexing. In this case, the uplink resource allocation information signal includes the transmission signal sequence number, and transmission signal sequence number is notified to the mobile terminal apparatus. Further, the scheduler 201 performs radio resource allocation of the uplink shared channel.

When the number of multiplexed users is the predetermined threshold or less, the uplink resource allocation information signal generating 202 applies orthogonal multiplexing (cyclic shift) to code multiplexing. In this case, the uplink resource allocation information signal includes a single transmission signal sequence number. In other words, in this case, a single transmission signal sequence number is notified to the mobile terminal apparatus. Meanwhile, when the number of multiplexed users exceeds the predetermined threshold, the uplink resource allocation information signal generating 202 combines non-orthogonal multiplexing with orthogonal multiplexing (cyclic shift) to apply as code multiplexing. In this case, the uplink resource allocation information signal includes a plurality of transmission signal sequence numbers, and the plurality of transmission signal sequence numbers is notified to the mobile terminal apparatus. Further, in the case of transmitting a data signal of fixed rate such as a voice signal, the need of signaling of the MCS information (channel coding rate, data modulation scheme) is eliminated, and in this case, the uplink resource allocation information signal does not include the MCS number.

The OFDM signal generating section 203 multiplexes the uplink resource allocation information including the sequence numbers (the transmission signal sequence number, the reference signal sequence number), the resource mapping information (including the resource block number), the cyclic shift number, and the MCS number, and the other downlink channel signals to be an OFDM signal, and the OFDM signal is transmitted as a downlink transmission signal.

In the mobile terminal apparatus, the OFDM signal demodulation section 104 receives the downlink OFDM signal to demodulate. Then, the broadcast channel signal/downlink control signal decoding section 105 extracts the sequence numbers (the transmission signal sequence number, the reference signal sequence number), the resource mapping information, the cyclic shift number, and the MCS number, outputs the transmission signal sequence number to the transmission signal sequence generating section 1019, outputs the reference signal sequence number to the reference signal sequence generating section 1021, outputs the resource mapping information to the subcarrier mapping sections 1016, 1023, outputs the cyclic shift number to the cyclic shift sections 1020, 1022, outputs the MCS number (channel coding rate) to the channel coding section 1011, and further, outputs the MCS number (data modulation scheme) to the data modulation section 1013.

The channel coding section 1011 performs channel coding on a data sequence to transmit with the channel coding rate associated with the MCS number broadcast from the radio base station apparatus. In addition, in the case of the fixed rate such as a voice signal, channel coding is performed with a beforehand determined channel coding rate. The data modulation section 1013 performs data modulation on the channel-coded data signal with the data modulation scheme associated with the MCS number broadcast from the radio base station apparatus. In addition, in the case of the fixed rate such as a voice signal, data modulation is performed with a beforehand determined data modulation scheme.

In the case of applying code multiplexing to user multiplexing, when a predetermined requirement is not met, for example, when the number of multiplexed users is a predetermined threshold or less, the transmission signal sequence generating section 1019 generates a single transmission signal sequence. Meanwhile, in the case of applying code multiplexing to user multiplexing, when the predetermined requirement is met, for example, when the number of multiplexed users exceeds the predetermined threshold, the transmission signal sequence generating section 1019 generates a plurality of transmission signal sequences. In addition, in the case of applying frequency multiplexing/time multiplexing to user multiplexing, the transmission signal sequence generating section 1019 does not generate any transmission signal sequence.

Next, the cyclic shift section 1020 provides the transmission signal sequence with cyclic shift associated with the cyclic shift number. Subsequently, the block modulation section 1026 performs block modulation on the cyclically-shifted transmission signal sequence with the data-modulated data signal. Then, the subcarrier mapping section 1016 maps the block-modulated data signal based on the resource mapping information. In this case, as shown in FIGS. 7(*a*) and 7(*b*), the data signal to which is applied code multiplexing is mapped to particular frequency domain. The subcarrier-mapped signal is transformed into the signal in the time domain by IFFT in the IFFT section 1017, and the CP is added to the signal in the CP adding section 1018.

Meanwhile, the cyclic shift section 1022 in the reference signal processing section 102 provides each of a plurality of subcarriers associated with the reference signal sequence with phase rotation. The cyclically-shifted signal is mapped in the subcarrier mapping section 1023 based on the resource mapping information. The subcarrier-mapped signal is transformed into the signal in the time domain by IFFT in the IFFT section 1024, and the CP is added to the signal in the CP adding section 1025.

Thus obtained data signal and reference signal are time-multiplexed, and the uplink shared channel signal in which orthogonal multiplexing (cyclic shift) and non-orthogonal multiplexing is combined and applied is transmitted to the radio base station apparatus. The radio base station apparatus receives the uplink shared channel signal that is orthogonally multiplexed among users.

In the radio base station apparatus, with respect to the reference signal, the CP removing section 2041 removes the CP. Next, the FFT section 2042 performs FFT on the CP-removed signal to be the signal in the frequency domain, and the subcarrier demapping section 2043 demaps from subcarriers based on the resource mapping information. The demapped reference signal is separated into reference signals for each user in the user separating section 2044. Then, the channel estimation section 2045 estimates a channel variation using the user-separated reference signal.

With respect to the data signal, the CP removing section 2051 removes the CP. Next, the FFT section 2052 performs FFT on the CP-removed signal to be the signal in the frequency domain, and the subcarrier demapping section 2053 demaps from subcarriers based on the resource mapping information.

With respect to the demapped data signal, the user separating section 2060 separates into data signals for each user, using the transmission signal sequence associated with the transmission signal sequence number and the cyclic shift associated with the cyclic shift number. In the case of applying code multiplexing to user multiplexing, when a predetermined requirement is not met, for example, when the number of multiplexed users is a predetermined threshold or less, the user separating section 2060 performs user separation using a single transmission signal sequence and cyclic shift. Meanwhile, in the case of applying code multiplexing to user multiplexing, when the predetermined requirement is met, for example, when the number of multiplexed users exceeds the predetermined threshold, the user separating section 2060 performs user separation using a plurality of transmission signal sequences and cyclic shift. In addition, in the case of applying frequency multiplexing/time multiplexing to user multiplexing, the user separating section 2060 does not perform user separation.

Next, the frequency domain equalization section 2054 compensates for the channel variation estimated in the channel estimation section 2045, and subsequently, the signal is subjected to IDFT in the IDFT section 2055 and is transformed into the signal in the time domain. Then, the data demodulation section 2057 performs data demodulation on the IDFT-processed data signal with the data modulation scheme (data modulation scheme used in the mobile terminal apparatus) associated with the MCS number. In addition, in the case of the fixed rate such as a voice signal, data modulation is performed with a beforehand determined data modulation scheme. Next, the data decoding section 2059 decodes the data-demodulated data signal, and obtains the data signal.

As can be understood from above-mentioned Embodiments 1 and 2, according to the invention, the mobile terminal apparatus performs the code multiplexing processing on a data signal with a code varying for each user, and transmits the data signal subjected to the code multiplexing processing to the radio base station apparatus on the uplink shared channel, the radio base station apparatus receives the data signal, and performs user division by the code multiplexing processing to obtain data signals for each user, and it is thereby possible to multiplex more users on the uplink shared channel.

The present invention is not limited to the above-mentioned Embodiments, and is capable of being carried into practice with various modifications thereof. The above-mentioned Embodiments describe the case of applying orthogonal multiplexing when the number of multiplexed users is relatively low, while combining and applying orthogonal multiplexing and non-orthogonal multiplexing when the number of multiplexed users is relatively high, in the case where code multiplexing is applied to user multiplexing, but the invention is not limited thereto, and is similarly applied to the case of applying non-orthogonal multiplexing when the number of multiplexed users is relatively low, while combining and applying orthogonal multiplexing and non-orthogonal multiplexing when the number of multiplexed users is relatively high, in the case where code multiplexing is applied to user multiplexing.

Further, without departing from the scope of the invention, the number of processing sections and processing procedures in the above-mentioned description are capable of being carried into practice with modifications thereof as appropriate. Furthermore, each element shown in the figures represents the function, and each function block may be actualized by hardware or may be actualized by software. Moreover, the invention is capable of being carried into practice with modifications thereof as appropriate without departing from the scope of the invention.

The present application is based on Japanese Patent Application No. 2009-182808 filed on Aug. 5, 2009, entire content of which is expressly incorporated by reference herein.

The invention claimed is:

1. A mobile terminal apparatus comprising:
   a spreading processing section configured to perform processing for multiplying a data signal by a code varying for each user;
   a transmission section configured to transmit the spreading-processed data signal to a radio base station apparatus on an uplink shared channel; and
   a mapping section configured to map the spreading-processed data signal to a resource block having a particular frequency band,
   wherein the spreading processing section performs spreading processing to the data signal by applying code division multiplexing as a user multiplexing method based on determination of a traffic amount in uplink by the radio base station apparatus, and when the code division multiplexing is applied and a number of multiplexed users exceeds a predetermined threshold, the spreading processing performed includes processing using orthogonal codes that are mutually orthogonal and processing using non-orthogonal codes,
   wherein the resource block having the particular frequency band to which the mapping section maps the spreading-processing data signal comprises bands dedicated to code division multiplexing that are separated from each other in a frequency domain, and
   wherein the spreading-processed data signal is subjected to inter-slot frequency hopping in a subframe.

2. A radio base station apparatus comprising:
   a reception section configured to receive a data signal subjected to spreading processing with a code varying for each user via an uplink shared channel;

a user separating section configured to separate desired user signals from a reception signal in which is mixed a plurality of users multiplied by spreading codes varying for each user to be data signals for each user; and a scheduler configured to determine whether or not to apply code division multiplexing as a user multiplexing method and to apply the spreading processing to a data signal based on a traffic amount in uplink, wherein when the code division multiplexing is applied and a number of multiplexed users exceeds a predetermined threshold, the spreading processing performed by a mobile terminal apparatus includes processing using orthogonal codes that are mutually orthogonal and processing using non-orthogonal codes, wherein when the code division multiplexing is applied as the user multiplexing method and the spreading processing is applied to the data signal, the scheduler allocates the data signal to each of bands dedicated to code division multiplexing that are separated from each other in a frequency domain as a particular resource block, and wherein the data signal is subjected to inter-slot frequency hopping in a subframe.

3. The radio base station apparatus according to claim 2, wherein when the code division multiplexing is applied as the user multiplexing method and the spreading processing is applied to the data signal, a spreading code number is broadcast.

4. A radio communication method comprising:
in a mobile terminal apparatus,
performing spreading processing for multiplying a data signal by a code varying for each user;
transmitting the spreading-processed data signal to a radio base station apparatus on an uplink shared channel;
in the radio base station apparatus,
receiving the data signal; and
user-separating a reception signal in which is mixed a plurality of users into spreading-processed data signals to be data signals for each user;
determining whether or not to apply code division multiplexing as a user multiplexing method and to apply the spreading processing to a data signal in the mobile terminal apparatus based on a traffic amount in uplink; and
allocating the data signal to a particular resource block when the mobile terminal apparatus applies the code division multiplexing as the user multiplexing method and applies the spreading processing to the data signal,
wherein, in performing the spreading processing, when the code division multiplexing is applied and a number of multiplexed users exceeds a predetermined threshold, the spreading processing performed includes processing using orthogonal codes that are mutually orthogonal and processing using non-orthogonal codes, and
wherein in allocating the data signal to the particular resource block, the data signal is subjected to inter-slot frequency hopping in a subframe.

5. The radio communication method according to claim 4, further comprising:
in the radio base station apparatus,
broadcasting a code when the mobile terminal apparatus applies the code division multiplexing as the user multiplexing method and applies the spreading processing to the transmission data signal.

* * * * *